(12) United States Patent
Bos

(10) Patent No.: US 11,593,768 B2
(45) Date of Patent: Feb. 28, 2023

(54) METHOD OF AUTOMATIC SCHEDULING, RELATED DEVICES AND COMMUNICATION SYSTEM

(71) Applicant: BlackBerry Limited, Waterloo (CA)

(72) Inventor: Jeffrey Charles Bos, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/809,185

(22) Filed: Mar. 4, 2020

(65) Prior Publication Data
US 2020/0202307 A1 Jun. 25, 2020

Related U.S. Application Data

(63) Continuation of application No. 14/845,455, filed on Sep. 4, 2015, now abandoned.

(51) Int. Cl.
*G06Q 10/10* (2012.01)
*G06Q 10/1093* (2023.01)

(52) U.S. Cl.
CPC ..... *G06Q 10/1097* (2013.01); *G06Q 10/1093* (2013.01)

(58) Field of Classification Search
None
See application file for complete search history.

(56) References Cited

U.S. PATENT DOCUMENTS

| 8,527,327 | B1* | 9/2013 | Lawrence | G06Q 10/103 |
| | | | | 705/7.38 |
| 8,639,552 | B1* | 1/2014 | Chen | G06Q 10/107 |
| | | | | 705/7.21 |
| 9,123,009 | B1 | 9/2015 | Etter et al. | |
| 2002/0078130 | A1* | 6/2002 | Thornton | G06F 9/5055 |
| | | | | 709/201 |
| 2002/0169650 | A1* | 11/2002 | Dougherty | G06Q 50/188 |
| | | | | 705/38 |
| 2004/0267871 | A1* | 12/2004 | Pratley | G06Q 10/10 |
| | | | | 709/200 |
| 2005/0076049 | A1* | 4/2005 | Qubti | G06Q 10/06 |
| 2005/0120108 | A1* | 6/2005 | Wisniewski | G06Q 10/107 |
| | | | | 709/224 |
| 2008/0065460 | A1* | 3/2008 | Raynor | G06Q 10/06 |
| | | | | 705/7.21 |

(Continued)

OTHER PUBLICATIONS

T.M Williams, The need for new paradigms for complex projects, International Journal of Project Management, vol. 17, Issue 5, 1999, pp. 269-273 (Year: 1999).*

(Continued)

*Primary Examiner* — Darlene Garcia-Guerra
(74) *Attorney, Agent, or Firm* — Fish & Richardson P.C.

(57) ABSTRACT

Systems, methods, and software can be used to manage tasks on an electronic device. In some aspects, a computer-implemented method comprises: determining, by an electronic device, that a last calendar event associated with a task has been completed; in response to determining that the last calendar event has been completed, outputting, on the electronic device, a task user interface, wherein the task user interface comprises a task status field; receiving, through the task user interface, a user input indicating a task status value; and updating, by the electronic device, a task status based on the task status value.

17 Claims, 7 Drawing Sheets

(56) References Cited

U.S. PATENT DOCUMENTS

| | | | |
|---|---|---|---|
| 2008/0066072 A1* | 3/2008 | Yurekli | G06Q 10/06 718/104 |
| 2008/0114809 A1* | 5/2008 | MacBeth | G06F 16/248 |
| 2008/0167938 A1 | 7/2008 | Meisels et al. | |
| 2009/0089133 A1 | 4/2009 | Johnson et al. | |
| 2009/0299811 A1* | 12/2009 | Verfuerth | G06Q 10/06 705/7.13 |
| 2010/0169146 A1* | 7/2010 | Hoyne | G06Q 10/109 705/7.21 |
| 2011/0099158 A1 | 4/2011 | Magnuson et al. | |
| 2011/0113008 A1* | 5/2011 | Jafri | G06Q 10/06 707/608 |
| 2011/0154338 A1* | 6/2011 | Ramanathaiah | G06Q 10/06 718/100 |
| 2011/0313803 A1 | 12/2011 | Friend et al. | |
| 2012/0110087 A1* | 5/2012 | Culver | G06F 16/95 709/205 |
| 2012/0271676 A1 | 10/2012 | Aravamudan et al. | |
| 2013/0173526 A1* | 7/2013 | Wong | H04N 21/8113 706/54 |
| 2013/0185108 A1 | 7/2013 | Bainbridge et al. | |
| 2014/0067455 A1 | 3/2014 | Zhang et al. | |
| 2014/0074591 A1* | 3/2014 | Allen | G06Q 30/0244 705/14.43 |
| 2014/0200944 A1* | 7/2014 | Henriksen | G06Q 10/1095 705/7.19 |
| 2014/0208325 A1* | 7/2014 | Chen | G06Q 10/06311 718/102 |
| 2014/0278057 A1 | 9/2014 | Berns | |
| 2014/0310045 A1* | 10/2014 | Meltzer | G06Q 10/1095 705/7.19 |
| 2015/0046207 A1 | 2/2015 | Hurd et al. | |
| 2015/0121386 A1* | 4/2015 | Marseille | G06Q 10/109 718/103 |
| 2015/0154526 A1* | 6/2015 | Yates | G06Q 10/06393 705/7.39 |
| 2015/0161571 A1* | 6/2015 | Judelson | G06Q 10/1095 705/7.19 |
| 2015/0178649 A1 | 6/2015 | Furman et al. | |
| 2015/0347586 A1 | 12/2015 | Fasen et al. | |
| 2015/0347987 A1* | 12/2015 | Ali | G06Q 10/1097 705/7.21 |
| 2016/0055490 A1* | 2/2016 | Keren | G06F 16/951 705/14.47 |
| 2016/0267439 A1 | 9/2016 | Bitran et al. | |
| 2017/0024243 A1* | 1/2017 | Kishan | G06F 1/329 |
| 2017/0061386 A1 | 3/2017 | Haynes et al. | |
| 2017/0068934 A1 | 3/2017 | Bos | |

OTHER PUBLICATIONS

Zack, James G. "Delay and delay analysis: Isn't it simple?." Proc., 1st ICEC and IPMA Global Congress on Project Management. International Cost Engineering Council, 2006 (Year: 2006).*
Maybury, Mark. "Intelligent user interfaces: an introduction." Proceedings of the 4th international conference on Intelligent user interfaces. 1998 (Year: 1998).*
Communication Pursuant to Article 94(3) EPC in European Application No. 16840471.3 dated Sep. 16, 2019, 8 pages.
Extended European Search Report issued in European Application No. 16840471.3 dated Jan. 14, 2019, 7 pages.
PCT International Preliminary report on Patentability in International Application No. PCT/CA2016/0151032, dated Mar. 6, 2018, 7 pages.
PCT International Search Report and written opinion in International Application No. PCT/CA2016/051032, dated Dec. 9, 2016, 9 pages.
Summons to Attend Oral Proceedings Pursuant to Rule 115 (1) EPC issued in European Application No. 16840471.3 on Dec. 3, 2020, 11 pages.

* cited by examiner

300

| Task | | | |
|---|---|---|---|
| 310 — Subject: Budget Review | | Scheduled: ☑ | — 330 |
| 312 — Time Required: | 3.5 hrs ▼ | | |
| 314 — Due Date: | Fri 12/20/2015 ▼ | 8:00 PM ▼ | |
| 316 — Priority | Normal ▼ | | |
| 318 — Progress Status | Not Started ▼ | | |
| 320 — Privacy | Private ▼ | | |
| 322 — Reminder: | ☑ 1.0 hrs ▼ | | |
| 324 — Add to Calendar: ☑ | | | |
| 328 — Note | | | |
| Save and Close | | Cancel | |
| ↳342 | | ↳344 | |

| ☑ | Subject | Due Date | Priority | Status |
|---|---|---|---|---|
| ☑ | Budget Review | Fri 12/20/2015 | Normal | Not Started |
| ☑ | Patent Review | Fri 12/20/2015 | High | In Progress |
| ☐ | Edit Statements | Fri 12/20/2015 | Low | Deferred |

Save and Close ↳362    Cancel ↳364

FIG. 3B

METHOD OF AUTOMATIC SCHEDULING, RELATED DEVICES AND COMMUNICATION SYSTEM

CROSS-REFERENCE TO RELATED APPLICATIONS

This application claims the benefit of U.S. application Ser. No. 14/845,455 filed on Sep. 4, 2015, the entire contents of which are incorporated by reference in its entirety.

TECHNICAL FIELD

The present disclosure relates generally to personal information management and, more specifically, to automatic scheduling, related devices and communication system.

BACKGROUND

A personal information manager (PIM) allow users to create, view and maintain a set of records concerning personal information, such as contact records, records of scheduled calendar events (e.g., appointments), records of scheduled tasks, etc. While tools to automate the creation and maintenance of such records have been proposed, the creation and maintenance of the PIMs remains largely a time-consuming and manual endeavor performed by users. Thus, there remains a need for tools to automate personal information management.

BRIEF DESCRIPTION OF THE DRAWINGS

FIG. 3A is a diagrammatic view of an example task user interface screen for creating or editing a task item of a task application in accordance with the present disclosure.

FIG. 3B is a diagrammatic view of an example task manager user interface screen for managing tasks of task application in accordance with the present disclosure.

DESCRIPTION OF EMBODIMENTS

Figure 1:
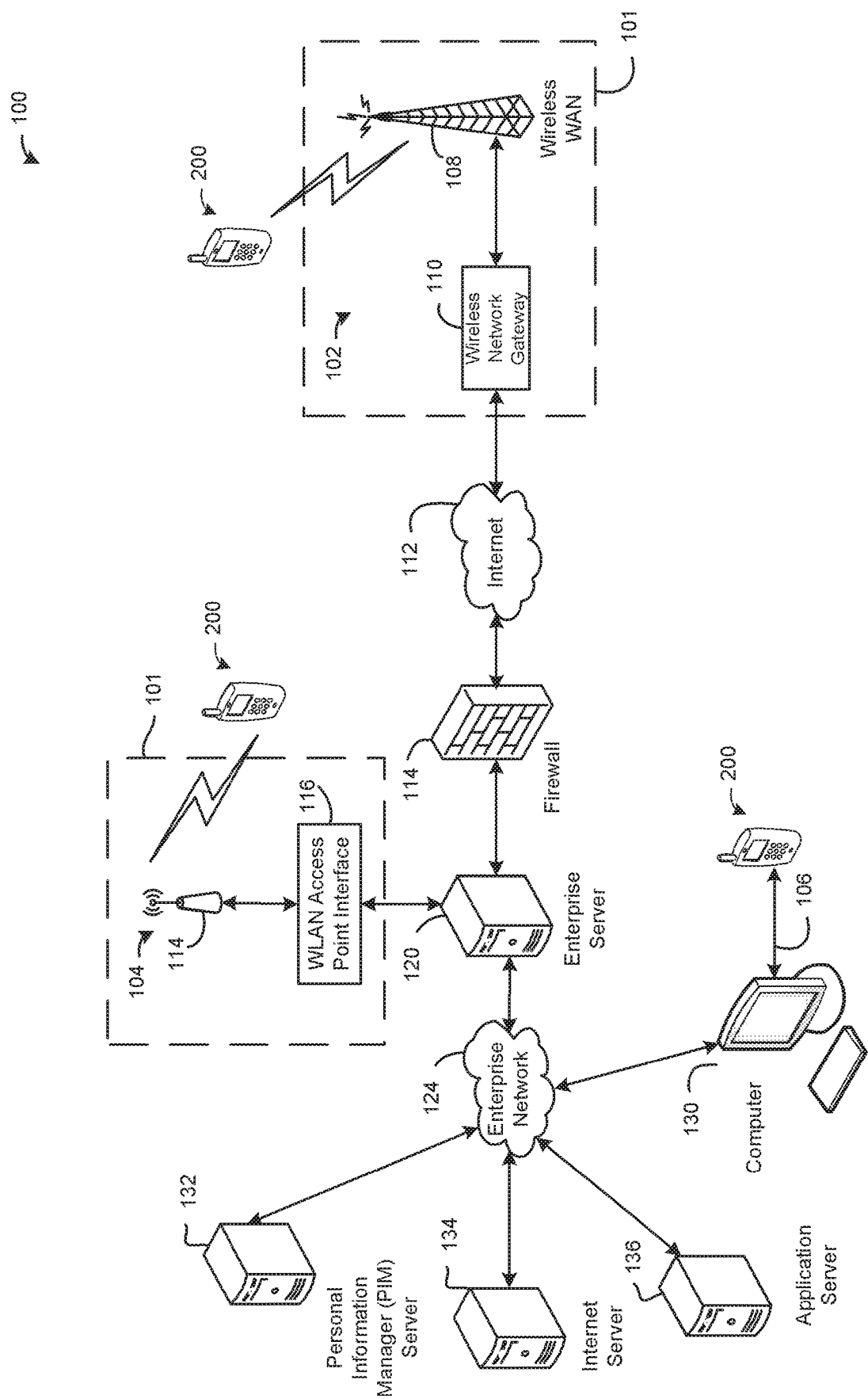
FIG. 1 is a schematic block diagram illustrating a communication system including a mobile wireless communication device to which example embodiments of the present disclosure can be applied.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements or steps in alternative embodiments.

In accordance with an example embodiment of one aspect of the present disclosure, there is provided a method of automatic scheduling on an electronic device, comprising: receiving one or more tasks associated with a user, wherein each task has an associated duration; determining available timeslots in a calendar database associated with the user; and automatically populating one or more of the available timeslots in the calendar database associated with the user with new calendar events associated with the one or more tasks in accordance with one or more scheduling rules.

In some embodiments, the one or more scheduling rules include a due date rule which specifies that new calendar events associated with the one or more tasks are automatically populated in the calendar database so that calendar events associated with tasks having a due date are scheduled to be completed before the due date of the respective tasks.

In some embodiments, the due date rule specifies that new calendar events associated with the one or more tasks are automatically populated in the calendar database so that calendar events associated with tasks having a due date are scheduled to be completed a threshold duration before the due date of the respective tasks In some embodiments, the automatic populating comprises: determining whether a total time represented by the available timeslots before the due date is greater than or equal to the associated duration of a particular task; when the total time represented by the available timeslots before the due date is less than the associated duration of the particular task, determining an amount of additional time to be allocated to the particular task; identifying any moveable calendar events in the calendar database associated with the user which can be moved; when the total time represented by any moveable calendar events in the calendar database associated with the user is greater than or equal to the amount of additional time to be allocated to the particular task, moving one or more of the moveable calendar events in the calendar database associated with the user to an available timeslot occurring after the due date until the total time represented by the available timeslots before the due date is greater than or equal to the associated duration of the particular task, and automatically populating one or more of the available timeslots in the calendar database associated with the user with new calendar events associated with the particular task in accordance with the one or more scheduling rules.

In some embodiments, the automatic populating further comprises: when the total time represented by any moveable calendar events in the calendar database associated with the user is less than the amount of additional time to be allocated to the particular task, providing a notification.

In some embodiments, the method further comprises: when the total time represented by the available timeslots before the due date is greater than or equal to the associated duration of the particular task, automatically populating one or more of the available timeslots in the calendar database associated with the user with new calendar events associated with the particular task in accordance with the one or more scheduling rules.

In some embodiments, a priority is associated with at least some of the one or more tasks, any calendar events associated with a task having a lower priority than the particular task are identified as moveable.

In some embodiments, a privacy setting is associated with at least some of the one or more tasks, wherein the privacy setting comprises values of "Private" or "Public", wherein tasks having the privacy setting of "Public" are identified as not moveable and tasks having the privacy setting of "Private" are identified as moveable.

In some embodiments, the method further comprises: automatically displaying a task user interface after completion of a calendar event associated with a particular task, wherein the task user interface includes a task status field having a value selectable from a number of predetermined task status field options; in response to a first value being set as the value of the task status field, automatically changing the status of the task status field; and in response to a value other than the first value being set as the value of the task status field, automatically displaying a prompt for a new duration; in response to receiving a new duration as input, automatically changing the duration associated with the particular task to the new duration received as input; determining available timeslots in the calendar database associated with the user; and automatically populating one or more of the available timeslots in the calendar database associated with the user with one or more new calendar events associated with the particular task in accordance with the new duration and the one or more scheduling rules.

In some embodiments, the particular task has an associated due date, the method further comprising: in response to a value other than the first value being set as the value of the task status field, automatically displaying a prompt for a new due date; in response to receiving a new due date as input, automatically changing the due date associated with the particular task to the new due date received as input; determining available timeslots in the calendar database associated with the user; and automatically populating one or more of the available timeslots in the calendar database associated with the user with one or more new calendar events associated with the particular task in accordance with the new due date and the one or more scheduling rules.

In some embodiments, the task user interface is automatically displayed only after a last completed calendar event associated with the particular task when more than one calendar event is associated with the particular task.

In some embodiments, the method further comprises: automatically displaying a task user interface after completion of a calendar event associated with a particular task, wherein the task user interface includes a task status field having a value selectable from a number of predetermined task status field options; in response to a first value being set as the value of the task status field, automatically changing the status of the task status field; and in response to a value other than the first value being set as the value of the task status field, automatically displaying a prompt for a new due date; in response to receiving a new due date as input, automatically changing the due date associated with the particular task to the new due date received as input; determining available timeslots in the calendar database associated with the user; and automatically populating one or more of the available timeslots in the calendar database associated with the user with one or more new calendar events associated with the particular task in accordance with the new due date and the one or more scheduling rules.

In some embodiments, one or more scheduling parameters which define days and/or times of day which are schedulable and days and/or times of day which are not schedulable are defined, wherein determining the available timeslots comprises determining available timeslots in the calendar database associated with the user which match the one or more scheduling parameters.

In some embodiments, a priority is associated with at least some of the one or more tasks, wherein the one or more scheduling rules include a priority rule which specifies that new calendar events associated with the one or more tasks are automatically populated in the calendar database so that calendar events associated with tasks having a priority are scheduled in accordance with an order of priority based on the priority associated with the one or more tasks.

In some embodiments, receiving the one or more tasks comprises: obtaining the one or more tasks from a task database associated with the user, wherein the task database associated with the user and the calendar database associated with the user are distinct databases which are separately maintained from each other.

In some embodiments, each calendar event associated with a task item is defined by a calendar object which includes linking information to the associated task, and each task item associated with one or more calendar events is defined by a task object which includes linking information to the one or more associated calendar events.

In some embodiments, each task in the task database and each calendar event in the calendar database have a unique identifier (ID), wherein the task object of each task item associated with one or more calendar events includes the unique IDs of the one or more associated calendar events, and wherein the calendar object of each calendar event associated with a task item includes the unique ID of the associated task.

In some embodiments, the automatic populating comprises: automatically generating one or more calendar events for a particular task; and storing the automatically generated calendar events in the calendar database for the user.

In some embodiments, the method further comprises identifying tasks that are available for scheduling, and the receiving comprises receiving one or more tasks that are available for scheduling.

In accordance with an example embodiment of another aspect of the present disclosure, there is provided an electronic device, comprising: a processor configured for: receiving one or more tasks associated with a user, wherein each task has an associated duration; determining available timeslots in a calendar database associated with the user; and automatically populating one or more of the available timeslots in the calendar database associated with the user with new calendar events associated with the one or more tasks in accordance with one or more scheduling rules.

In accordance with an example embodiment of a further aspect of the present disclosure, there is provided a non-transitory machine readable medium having tangibly stored thereon executable instructions that, when executed by a processor, cause the processor to perform a method of automatic scheduling, the method comprising: receiving one or more tasks associated with a user, wherein each task has an associated duration; determining available timeslots in a calendar database associated with the user; and automatically populating one or more of the available timeslots in the calendar database associated with the user with new calendar events associated with the one or more tasks in accordance with one or more scheduling rules.

The present disclosure provides a method of automatic scheduling, related devices and communication system, and in particular, a productivity application for automatic scheduling of calendar events for a task. Research has shown that users are adopting a much more calendar-focused approach for managing their tasks. Often users will block free time to carry out specific actions, however if the task is incomplete, the user must manually move the action to another free time slot in their Calendar to avoid forgetting. The present disclosure provides a method for automatic scheduling of calendar events for a task. The user provides one or more tasks along with the estimated time required to complete each task. An order of priority of the tasks and/or a task deadline may also be provided. The application will then populate the calendar with events to occupy empty time slots, for example, during the week. Users may also drag and drop the tasks into the calendar to create calendar events as desired. Users will receive a timely notification to remind them to start the task when appropriate. At the end of the time allocated for completing the task, the user receives a user interface prompt asking if the task is complete, if it should be rescheduled or deferred, or if more time is required to complete the task. Based on user feedback, the system will automatically find the next suitable time slot and move other tasks in the calendar based on the priority of those tasks or other factors. The user will also have the option to set tasks as "public" which will block off time in the calendar to prevent another meeting from conflicting with the work time or "private" which will allow other meetings automatically to move the task to another available (i.e. "open") timeslot. Other features will be appreciated in view of the following disclosure.

Reference is first made to FIG. 1 which shows in schematic block diagram form a communication system 100 in which example embodiments of the present disclosure can be applied. The communication system 100 comprises a plurality of mobile wireless communication devices ("devices") 200 connected to a wireless network 101. The wireless network 101 comprises one or more of a wireless Wide Area Network (WAN) 102 and a Wireless Local Area Network (WLAN) 104. The device 200 may be configured to communicate over both the wireless WAN 102 and WLAN 104, and to roam between these networks.

The communication system 100 also comprises a wireless network gateway 110 with connects the devices 200 to the Internet 112, and through the Internet 112 to a wireless connector system such as an enterprise server 120. The wireless network gateway 110 provides translation and routing services between the enterprise server 120 and the WAN 102, which facilitates communication between the devices 200 and other devices (not shown) connected, directly or indirectly, to the wireless network 101. Accordingly, communications sent via the devices 200 are transported via the wireless network 101 to the wireless network gateway 110. The wireless gateway 110 forwards the communication to the enterprise server 120 via the Internet. Communication sent from the enterprise server 120 are received by the wireless network gateway 110 and transported via the wireless network 101 to the devices 200.

The wireless WAN 102 may be implemented as a packet-based cellular network that includes a number of transceiver base stations 108 (one of which is shown in FIG. 1) where each of the base stations 108 provides wireless Radio Frequency (RF) coverage to a corresponding area or cell. The wireless WAN 102 is typically operated by a cellular network service provider that provides subscription packages to users of the devices 200.

The WLAN 104 comprises a wireless network which, in some embodiments, conforms to IEEE 802.11x standards (sometimes referred to as Wi-Fi®) such as, for example, the IEEE 802.11a, 802.11b and/or 802.11g standard. Other communication protocols may be used for the WLAN 104 in other embodiments. The WLAN 104 includes one or more wireless RF Access Points (AP) 114 (one of which is shown in FIG. 1) that collectively provide a WLAN coverage area.

The WLAN 104 is operated by an enterprise (for example, a business or university) and the access points 114 are connected to an access point (AP) interface 116 in the shown embodiment. The AP interface 116 provides translation and routing services between the access points 114 and the enterprise server 120 to facilitate communication between two or more of the devices 200 and other devices (not shown) connected, directly or indirectly, to the enterprise server 120. The AP interface 116 may be implemented using a computer, for example, a server running a suitable computer program or software.

The enterprise server 120 may be implemented as one or more server modules, and is typically located behind a firewall 114. The enterprise server 120 provides the devices 200 with access to an organization's internal network referred to as an enterprise network 124 and provides administrative control and management capabilities over users and devices 200 which may connect to the enterprise network 124. The enterprise server 120 is dedicated to managing communications to and from a set of managed devices 200 (the enterprise devices 200) so that enterprise devices 200 are each enabled to exchange electronic messages and other information with resources and devices (e.g., computers) connected to the enterprise network 124.

The enterprise server 120 allows the enterprise devices 200 to access resources of the enterprise network 124 including a personal information manager (PIM) server 132 such as, for example, Microsoft Exchange™, for connecting to an enterprise messaging system, an Internet server 134 for connecting to the Internet, and an application server 136 for implementing enterprise applications or for accessing other servers. The PIM server 132 provides messaging, calendar, task and address book functions. The enterprise server 120 is configured to direct or redirect email messages, instant messages (IM) and other corporate data received from the wireless network 101 and internally within the enterprise network 124 to be addressed to the devices 200.

The enterprise server 120 also provides secure transmission of email, IM and other corporate or enterprise data transmitted from the enterprise server 120 to enterprise devices 200. In some embodiments, communications between the enterprise server 120 and the devices 200 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. The private encryption key is stored in a dedicated user storage area on the PIM server 132 and on the device 200, and can typically be regenerated by the user on the device 200. Data sent to the devices 200 is encrypted by the enterprise server 120 using the private encryption key retrieved from the dedicated user storage area. The encrypted data, when received on the devices 200, is decrypted using the private encryption key stored in memory. Similarly, data sent to the enterprise server 120 from the devices 200 is encrypted using the private encryption key stored in the memory of the device 200. The encrypted data, when received on the enterprise server 120, is decrypted using the private encryption key retrieved from the dedicated user storage area.

The enterprise server 120 may comprise a mobile data delivery module (not shown) which provides connectivity between the wireless WAN 102 and the WLAN 104 and the other connections 106 and devices 200 and/or networks connected directly or indirectly to the enterprise server 120.

Alternatively, the mobile data delivery module (not shown) may be implemented by a separate server or server application which is connected to the enterprise server 120. In some embodiments, the mobile data delivery module (not shown) provides TCP/IP (transmission control protocol/Internet protocol) and HTTP (hypertext transfer protocol)-based connectivity providing an Internet based service connection. The mobile data delivery module provides access for the devices 102 to the Internet 112 and World Wide Web (WWW) and possibly other external communication networks.

The wireless network gateway 110 is adapted to route data packets received from the device 200 over the wireless network 101 to destination email and/or Instant PIM server 132, Internet/Web servers 134, and one or more application servers 134 through the mobile data delivery module, and to route data packets received from the servers 132, 134, 136 through the mobile data delivery module over the wireless network 101 to a destination device 200. The wireless network gateway 110 forms a connection or bridge between the servers 132, 134, 136 and wireless networks associated with wireless e-mail communication and/or Internet access.

The enterprise network 124 may comprise a private local area network, wide area network, or combinations thereof. Typically, the enterprise network 124 is an intranet of a corporation or other organization. The enterprise server 120 may also provide access to other public or private communication networks such as the Internet 112. A plurality of enterprise computers 130 (one of which is shown in FIG. 1), such as desktop or notebook computers, are connected to the enterprise network 124 by a wired connection or through a WLAN access point interface 116.

Mobile wireless communication devices 200 may be connected to the enterprise network 124 via an AP 114 or via a computer 130 using a physical interface or short-range wireless communication interface 106 between the computer 130 and a mobile wireless communication device 200. Synchronization between devices 200 and a host computer 130 may be performed as understood by those skilled in the art. Databases that store PIM data, such as messages, calendar event data, and task data, may exist on a mobile wireless communication device 200, a host computer 130, and/or the PIM server 132. Synchronization may be performed wirelessly via the wireless network 101 or via a computer 130 using a physical interface or short-range wireless communication interface 106 between the computer 130 and a mobile wireless communication device 200. The databases that store PIM data may be of various configurations and locations, and may be accessed on the device 200, computer 130, PIM server 132 or accessed by any of these systems remotely, or by an Application Programming Interface (API) where the database architecture may not be known.

It will be appreciated that the above-described communication system is provided for the purpose of illustration only, and that the above-described communication system comprises one possible communication network configuration of a multitude of possible configurations for use with the devices 200. Suitable variations of the communication system will be understood to a person of skill in the art and are intended to fall within the scope of the present disclosure.

Figure 2:
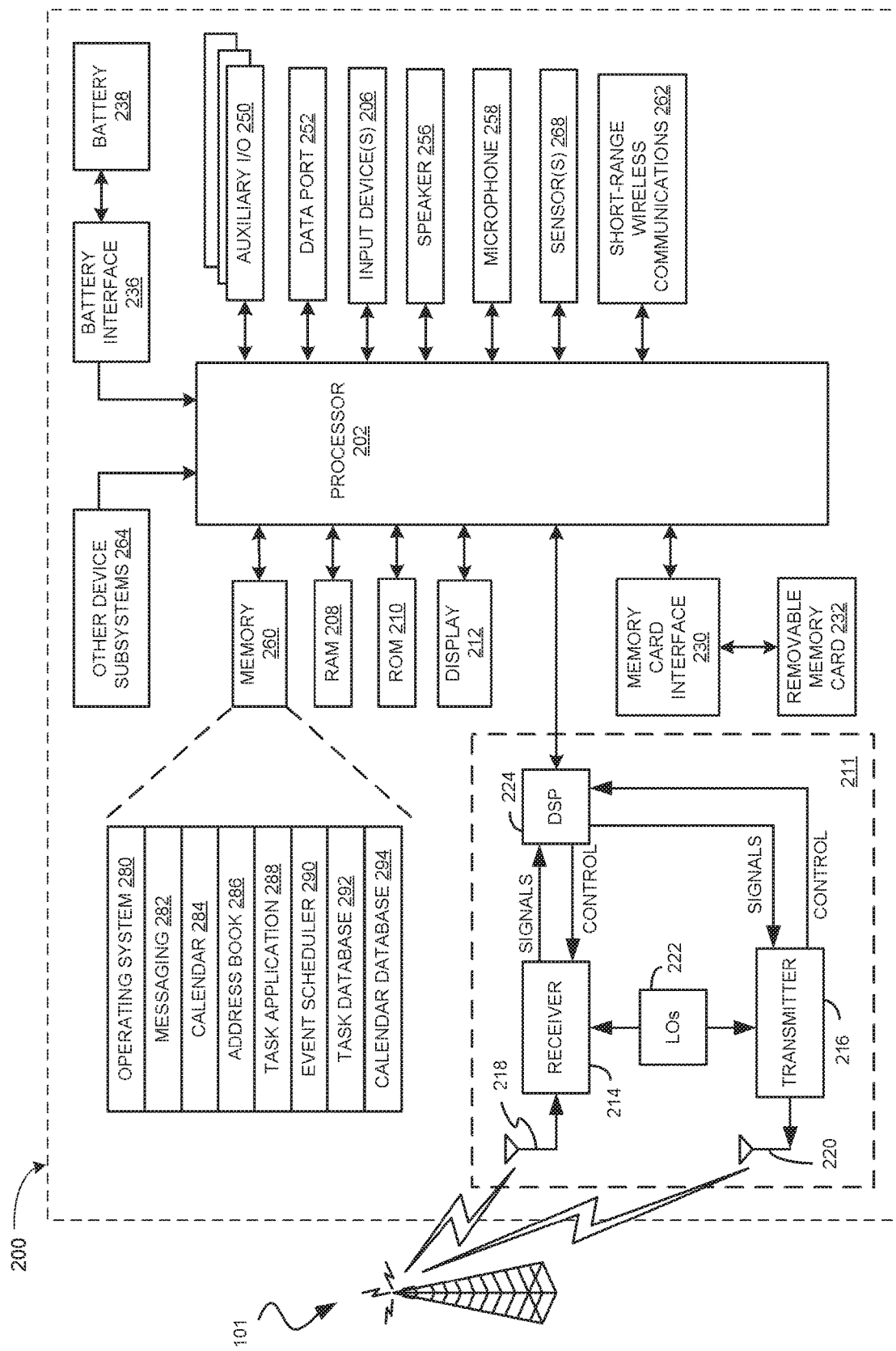
FIG. 2 is a schematic block diagram illustrating a mobile wireless communication device that may be used with the wireless communication system of FIG. 1.

Reference is next made to FIG. 2 which illustrates in block diagram form a device 200 in which example embodiments described in the present disclosure can be applied. Examples of the device 200 include, but are not limited to, a mobile (or cellular) telephone, smartphone or superphone, and tablet computer. Other possible examples of the device 200 include a notebook computer (also known as a laptop, netbook or ultrabook computer depending on the device capabilities), portable or personal media player (e.g., music or MP3 players, video players, etc.), wireless organizer or personal digital assistant (PDA), portable gaming device, special purpose digital camera or wearable computer such as a smartwatch or optical head-mounted display.

The device 200 illustratively includes a rigid case or housing (not shown) which carries the electronic components of the device 200. The housing may be elongated vertically, or may take on other sizes and shapes (including clamshell housing structures). The device 200 includes a controller comprising at least one processor 202 (such as a microprocessor) which controls the overall operation of the device 200.

The processor 202 interacts with other components, such as input device(s) 206, Random Access Memory (RAM) 208, Read Only Memory (ROM) 210, wireless communication subsystem 211 for exchanging radio frequency signals with a wireless network 101, a display 212 such as a color liquid crystal display (LCD) or active-matrix organic light-emitting diode (AMOLED) display, persistent (non-volatile) memory 260 which may be flash erasable programmable read only memory (EPROM) memory (flash memory) or other suitable form of memory, sensor(s) 268 such as a motion sensor, an orientation sensor and/or proximity sensor, auxiliary input/output (I/O) subsystems 250, data port 252 such as serial data port (e.g., Universal Serial Bus (USB) data port), speaker 256, microphone 258, a short-range communication subsystem 262, and other device subsystems 264 such as a camera, global positioning system (GPS), vibrator or light-emitting diode (LED) notification light. The components of the device 200 are coupled via a communication bus (not shown) which provides a communication path between the various components.

The input device(s) 206 may include a keyboard or keypad, one or more buttons, one or more switches, a touchpad, a rocker switch, a thumbwheel, or other type of input device. In addition to or instead of a keyboard or keypad, the display 212 may be provided as part of a touchscreen or touch-sensitive display which provides an input device 206. The display 212 which together with a touch-sensitive overlay (not shown) operably coupled to an electronic controller (not shown) may comprise the touch-sensitive display. The touch-sensitive display is typically a capacitive touch-sensitive display which includes a capacitive touch-sensitive overlay.

User-interaction with a graphical user interface (GUI) presented on the display 212 performed using the input devices 206. Information, such as text, characters, symbols, images, icons, and other items are rendered and displayed on the display 212 via the processor 202. The processor 202 may interact with one or more sensors 268, such as the orientation sensor to detect direction of gravitational forces or gravity-induced reaction forces so as to determine, for example, the orientation of the device 200 in order to determine a screen orientation for the GUI.

Operating system software 280 executed by the processor 202 is stored in the persistent memory 260, such as flash memory, but may be stored in other types of memory devices, such as ROM 210 or similar storage element. User data 280 is also stored in the persistent memory 260. System software, software modules, specific device applications, or parts thereof, may be temporarily loaded into a volatile store, such as RAM 208, which is used for storing runtime data variables and other types of data or information. Communication signals received by the device 200 may also be stored in the RAM 208. Although specific functions are described for various types of memory, this is merely one example, and a different assignment of functions to types of memory could also be used.

The processor 202, in addition to its operating system functions, enables execution of software applications on the device 200. A predetermined set of applications or functional software modules that control basic device operations, such as voice communication module (not shown) and data communication module (not shown) may be installed on the device 200, for example, during manufacture. New applications and updates to installed applications may be installed by the user, for example, via the Internet. In an example embodiment, the software resident on the device 200 includes a messaging application 282, a calendar 284, an address book 286, a task application 288, and an event scheduler 290. A task database 292 for storing task items and a calendar database 294 for storing calendar events and other data may also be stored in the memory 260 along with other data. The task items and calendar events can then be stored or accessed by one of the modules or applications. The task database 292 and the calendar database 294 associated are distinct databases which are separately maintained from each other. Tasks and associated calendar events may be linked, as described in greater detail below. In some embodiments, some or part of the functionality of the functional modules or applications can be implemented through firmware or hardware components instead of, or in combination with, computer software instructions executed by the processor 202.

The event scheduler 290 is provided for facilitating the scheduling of events, as will be explained in greater detail below. The messaging module 282 enables the device 200 to send and receive messages, such as email messages, over the wireless network 101. The term "message" is used herein to designate any type of electronic message such as an email (which may include a thread of emails), text or SMS message, instant message, etc.

The event scheduler 290 may be implemented as part of an electronic messaging application, such as the messaging module 282 or as part of a general event scheduling application, such as the calendar 284. Alternatively, the event scheduler 290 may be implemented as an independent application that communicates with an electronic messaging application and/or a general event scheduling application. Alternatively, the event scheduler 290 may be implemented as part of a PIM application. The PIM application may be capable of organizing and managing data items, such as email, calendar events, voice mails, appointments, and task items. The PIM application may be used instead of the separate messaging application 282, calendar application 284, address book 286, and task application 288. The PIM application may also be capable of sending and receiving data items via the wireless network 101. The PIM data items may be seamlessly integrated, synchronized and updated via the wireless network 101 with corresponding data items stored or associated with a host computer 130 and/or PIM server 132.

The address book 104 enables contact information, such as telephone numbers, personal identification numbers (PIN), and email and/or instant text messaging addresses, to be stored and accessed on the device 10. As mentioned above, such contact information may be stored in memory 24, within a contact information database 110. The messaging module 108 enables the device 10 to transmit and receive messages over one or more wireless networks 50. In some embodiments, PIN messages may be sent directly from one electronics communications device to another without passing through an employer company's server.

The device 200 is a two-way wireless Radio Frequency (RF) communication device having data and/or voice communication capabilities. In addition, the device 200 may have the capability to communicate with other computer systems via the Internet. The wireless communication subsystem 211 exchanges radio frequency signals with the wireless network 101. The wireless communication subsystem 211 comprises a wireless Wide Area Network (WAN) communication subsystem for two-way communication with a wireless WAN, such as a cellular network. The device 200 may communicate with any one of a plurality of fixed transceiver base stations (not shown) of the wireless network 101 within its geographic coverage area. The device 200 may send and receive communication signals over the wireless network 101 after the required network registration or activation procedures have been completed. In addition, the wireless communication subsystem 211 may comprise a Wireless Local Area Network (WLAN) communication subsystem for two-way communication with a WLAN via wireless access points (not shown), e.g. Wi-Fi™.

Communication functions, including data and voice communication, are performed through the communication subsystem 211 and possibly through the short-range communication subsystem 262. Data received by the device 200 may be decompressed and decrypted by a decoder (not shown). The communication subsystem 211 includes a receiver 218, a transmitter 216, and one or more antennas 218 and 220. In addition, the communication subsystem 211 also includes a processor, such as a digital signal processor (DSP) 224, and local oscillators (LOs) 222. The specific design and implementation of the communication subsystem 211 is dependent upon the wireless communication network(s) 104 in which the device 200 is intended to operate. For example, the device 200 may include a communication subsystem 211 designed to operate with the Mobitex™, Data TAC™ or General Packet Radio Service (GPRS) mobile data communication networks, and also designed to operate with any of a variety of voice communication networks, such as Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of data and voice networks, both separate and integrated, may also be utilized with the device 200. The device 200 may also be compliant with other communication standards such as 3GSM, 3rd Generation Partnership Project (3GPP), Universal Mobile Telecommunication System (UMTS), 4G, etc.

Network access requirements vary depending upon the type of communication system. For example, in GPRS networks, network access is associated with a subscriber or user of a device. The device 200 also includes a memory card interface 230 for receiving a removable memory card 232 comprising persistent memory, such as flash memory. The memory card 232 can be inserted in or coupled to the memory card interface 230 for storing and reading data by the processor 202.

When required network registration or activation procedures have been completed, the mobile device 200 may send and receive communication signals over the communication network 104. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220.

In addition to processing communication signals, the DSP 224 provides for control of the receiver 214 and the transmitter 216. For example, the gains applied to communication signals in the receiver 214 and the transmitter 216 may be adaptively controlled through automatic gain control algorithms implemented in the DSP 224.

In a data communication mode, a received signal, such as a text message or web page download, is processed by the communication subsystem 211 and is input to the processor 202. The received signal is then further processed by the processor 202 for an output to the display 212, or alternatively to some other auxiliary I/O device 250. The device 200 may also be used to compose data items, such as email messages, using the input device(s) 206 and/or some other auxiliary I/O device 250. The composed data items may then be transmitted over the communication network 104 via the communication subsystem 211.

In a voice communication mode, overall operation of the device is substantially similar to the data communication mode, except that received signals are output to a speaker 256, and signals for transmission are generated by a microphone 258. Alternative voice or audio I/O subsystems, such as a voice message recording subsystem, may also be implemented on the device 200. In addition, the display 212 may also be utilized in voice communication mode, for example to display the identity of a calling party, the duration of a voice call, or other voice call related information.

The short-range communication subsystem 262 enables communication between the device 200 and other proximate systems or devices, which need not necessarily be similar devices. The short-range communication subsystem 262 may include a Near field communication (NFC) subsystem or subsystem for Bluetooth™, IEEE 802.11, IEEE 802.15.3a (also referred to as UltraWideband (UWB)), Z-Wave, Zig-Bee, or infrared such as an Infrared Data Association (IrDA) communication, as well as a corresponding communication module in persistent memory 260 to provide for communication with similarly-enabled systems and devices.

The device 200 also includes a battery 238 as a power source, which is typically one or more rechargeable batteries that may be charged, for example, through charging circuitry coupled to a battery interface such as the serial data port 252. The battery 238 provides electrical power to at least some of the components of the device 200, and the battery interface 236 provides a mechanical and electrical connection for the battery 238. The battery interface 236 is coupled to a regulator (not shown) which provides power V+ to the circuitry of the device 200.

FIG. 3A shows a diagrammatic view of a task user interface 300 for a task application in accordance with one example embodiment of the present disclosure. The task user interface 300 may be used to create and store a new task or edit an existing task. The task user interface 300 includes task information concerning a particular task. The task information is provided by a number of fields, at least some of which are selectable and editable by the user. The provided fields may differ between different embodiments. In the shown embodiment, the task user interface 300 includes a subject field 310, a time required field (also known as the duration field) 312, a due date field 314, a priority field 316, a status field 318, a privacy (or sensitivity) field 320, a reminder field 322, a schedule field 324 (shown as "Add to Calendar"), and a note field 328. The various fields of the task user interface may be comprised of subfields, or in other embodiments multiple fields may be provided. The type of field also varies between the various fields. The task user interface 300 also includes a "Save and Close" button 342 for saving the task item and closing the task user interface 300, and a "Cancel" button 344 for discarding any received input and closing the task user interface 300. The task user interface 300 may also include a schedule status field 330 (shown as "Scheduled").

The subject field 310 is a text field in which a subject of the task can be entered.

The duration field 312 comprises a number field and a text field in which an estimated time required for the task can be entered. Alternatively, the duration field 312 may be a dropdown list from which a duration can be selected from a number of predetermined duration options. The duration field 312 may be dynamic. For example, the value of the field may decrease after each the completion/occurrence of each associated calendar event by an amount equivalent to the duration of the completed calendar event. For example, when the duration field of a task is initially set at 3.5 hours (hrs) and a calendar event having a duration of 1.0 hour associated with the task completes (i.e., the timeslot allocated to the calendar event has past), the duration field 312 may be reduced by 1.0 hour to a value of 2.5 hours.

The due date field 314 is a date field in which a due date for the task can be entered. The due date field 314 may also include a time field for entering a time on the due date by which the task should be completed. In some embodiments, the task application 288 performs a check to ensure that the value of the due date field 314 occurs in the future and prompts the user for a new due date when the value of the due date field 314 is set in the past.

The priority field 316 is a dropdown list from which a priority value can be selected from a number of predetermined priority field options. In the shown embodiment, the priority field options are "Low", "Normal" and "High", thereby allowing a qualitative priority to be specified.

Alternatively, in other embodiments a specific and unique priority can be assigned to tasks, thereby allowing an absolute priority or priority ranking to be assigned. For example, the user may assign each task a unique priority ranking in decreasing order of importance. For example, the highest priority task may be assigned a priority ranking of "1", the second highest priority task may be assigned a priority ranking of "2" and so forth until all tasks have been assigned a priority ranking. The priority ranking may be dynamic. For example, when a task is completed as determined by the value of status field 318 of the respective task, the priority of the remaining uncompleted tasks may be automatically updated (i.e., without user intervention). For example, when the task with a priority ranking of "1" is completed, the task with the priority ranking of "2" will have the value of its priority ranking updated to "1".

A dedicated user interface may be provided to assist in inputting and managing the priority ranking of the tasks in the task database 292. An example of a task manager user interface 360 is shown in FIG. 3B. The task manager user interface 360 provides a list of tasks items stored in the task database 292. Task information is provided in the task manager user interface 360. In the shown example, the subject 310, due date 314, priority 316, status 318, and schedule field 324. The task manager user interface 360 also includes a "Save and Close" button 362 for saving the changes to the task items and closing the task manager user interface 360, and a "Cancel" button 364 for discarding any received input and closing the task manager user interface 360. The task manager user interface 360 allows multiple tasks to be viewed and edited from a common user interface. For example, the priority of all tasks in the task database 292 could be viewed and edited as necessary.

The status field 318 is a dropdown list from which a task status can be selected from a number of predetermined task status options. The status field 318 has at least two task status field options. In a relatively simple embodiment, the task status field has a value of "Completed" or "Not Completed". In the shown embodiment, the task status field options include "Not Started", "In Progress", "Waiting on someone else", "Deferred" and "Completed". In some embodiments, the status of "Not Started" may be automatically assigned by the task application 288 before any scheduled calendar event associated with a particular task have occurred (e.g., before such events have been started or completed) and that status of "In Progress" may be automatically assigned by the task application 288 after a scheduled calendar event associated with the particular task has occurred but other scheduled calendar event associated with the task remain.

The privacy field 320 is a dropdown list from which a privacy setting can be selected from a number of predetermined privacy setting options. The privacy field 320 has at least two privacy field options. In a relatively simple embodiment, the privacy field 320 has a value of "Private" or "Public". A task having the privacy setting of "Public" is published to a public calendar (if any) maintained by the PIM server 132 and can only be moved by the user and not the event scheduler 290. Thus, tasks having the privacy setting of "Public" can be identified by the event scheduler 290 as not moveable. In contrast, tasks having the privacy setting of "Private" are not published to a public calendar (if any) and can be moved by either the event scheduler 290 or the user. Thus, tasks having the privacy setting of "Private" can be identified by the event scheduler 290 as moveable. It will be appreciated that calendar events associated with private tasks may be stored in the calendar database 294 of the user, or private tasks may be stored in other databases and marked as "Private". The privacy setting, in addition to determining whether a calendar event associated with a task is published to a public calendar, provides a mechanism for identifying moveable calendar events.

The reminder field 322 comprises a number field and a text field in which a duration of time before a calendar event for generating a reminder can be entered. The duration specifies a time before a calendar event associated with a task at which a reminder is generated. Alternatively, the reminder field 322 may be a dropdown list from which a duration can be selected from a number of predetermined duration options. The reminder field 322 may also include a toggle, such as a checkbox, for enabling or disabling reminders. When reminders are enabled, for example by checking the checkbox, a duration can be set by the user. A default duration may be defined in the absence of user input. For example, the reminder date may be set as a default number of days after the task is created or a default number of days before the due date of the task (if any), whereas the reminder time may be a default time of day or a default amount of time before the due date of the task (if any). Alternatively, the default reminder may be 0, i.e. to generate the reminder when the associated calendar event starts.

The schedule field 324 (shown as "Add to Calendar") comprises a toggle, shown as a checkbox, to indicate whether or not the task is to be scheduled. When a particular task is to be scheduled, a user can check the checkbox. The schedule field 324 may have a default status of "on" or "yes" so that the task will be scheduled (e.g., the checkbox is checked) which the user can change if desired. In other embodiments, the schedule field 324 could be omitted. The value of the schedule field 324 of multipole tasks may be changed relatively easily with the task manager user interface 360 (FIG. 3B), described above.

The note field 328 is a text field in which additional information about the task can be entered.

The schedule status field 330 (shown as "Scheduled") provides an indication as to whether the respect task item has been scheduled, i.e. whether corresponding calendar events have been created and added to the calendar database 284. The schedule status field 330 is not user editable. Instead, the schedule status field 330 reflects the schedule status of the particular task item. In the shown example, a checked checkbox is used to indicate that a task item has been scheduled whereas an unchecked checkbox is used to indicate that a task item has not been scheduled. The checkbox is merely an example of a visual indication of the schedule status. Other means of visual indication of the schedule status are possible. In other embodiments, the schedule status field 330 could be omitted.

The task user interface 300 can be used to create a task and edit the task parameters at any time thereafter. For example, the task user interface 300 may be used to edit the time required (duration) field 312 or the status field 318 at any time. When changes are made to uncompleted tasks, calendar events associated with those tasks are changed accordingly. This may involve changing the number, duration and/or date/time at which the associated calendar events are scheduled to occur. The changes to calendar events associated with a task may be made in response to the saving of changes to a task item, for example, after the changes to a task item are saved. Alternatively, the changes may be made in response to designated input, such as input to schedule any unscheduled tasks or input to update scheduled tasks. For example, toggling the schedule field 324 from "yes" to "no: (e.g., from checked to unchecked) will cause scheduled calendar events associated with a task to be cancelled, and toggling the schedule field 324 from "no" to "yes" (e.g., from unchecked to checked) will cause new calendar events to be added based on the available timeslots. In some embodiments, when a change to task which affects scheduled calendar events associated with the task is made, for simplicity the scheduled calendar events are cancelled and new calendar events are added based on the available timeslots, as described elsewhere herein.

It is contemplated that a task may be dependent on one or more actions in some embodiments. The one or more actions upon which a task depends may include one or more other tasks. A particular action or task may have one or more tasks which depend on it. In some embodiments, if the status 318 is set to "Waiting for someone else" the user may be provided with an option to specify an action on which the task depends and an owner of the action via a shared calendar such as that provided by Microsoft Exchange™.

When the status 318 is set to "Waiting for someone else", the task may not be not available for scheduling.

When a particular task is dependent on one or more other actions (the "dependent task"), the other actions (e.g., tasks) upon which the particular task depends are to be completed before the dependent task is started and before the dependent task is available for scheduling. The schedule field 324 may be used to indicate whether a task is available for scheduling in some embodiments. For example, the schedule field 324 may have a value of "yes" or "no" or equivalent. When the value of the schedule field 324 is "yes", the task is available for scheduling, and when the value of the schedule field 324 is "no", the task is not available for scheduling. The task user interface 300 may be used to provide a user interface for setting task dependencies in some embodiments. When a task upon which a dependent task depends is not completed the value of the schedule field 324 is "no" and the schedule field 324 (shown as "Add to Calendar") may be unchecked and unselectable by the user (possibly grayed out), or the schedule field 324 may not be shown in the task user interface 300 for the particular task. Task dependency information and whether a task is available for scheduling may be stored in the task items of the respective tasks (e.g., the dependent task and the one or more tasks on which it depends) by the task application 288 and/or calendar application 284. When all tasks on which a dependent task depends are completed (as indicated by the value of the respective status field(s) 318), the dependent task is released for scheduling. Alternatively, whether a task is available for scheduling may be recorded by other means.

In some embodiments, if the status 318 is set to "Deferred" the user may be provided with an option to specify a date to begin or resume scheduling the task. When the status 318 is set to "Deferred", the task may not be not available for scheduling. Before the deferred date, the schedule field 324 (shown as "Add to Calendar") may be unchecked and unselectable by the user (possibly grayed out), or the schedule field 324 may not be shown in the task user interface 300 for the particular task. Setting a deferred date which occurs on or after the due date 314 may cause the task application 288 to automatically adjust the due date 314 to the deferred date or a default amount of time after the deferred date, depending on the embodiment.

Once the user is satisfied with the information included in the task user interface 300, the user can select the "Save and Close" button 342" which causes the information in the fields of the task user interface 300 to be saved as a task item in the task database 292 in the memory 260 of the device 200 or in a storage accessible to the device 200. Once the information has been saved, the new task item will appear as an entry in the task application 288, for example in the task manager user interface, and can be opened by appropriate input selecting the calendar event for viewing, editing or deletion.

Figure 4A:
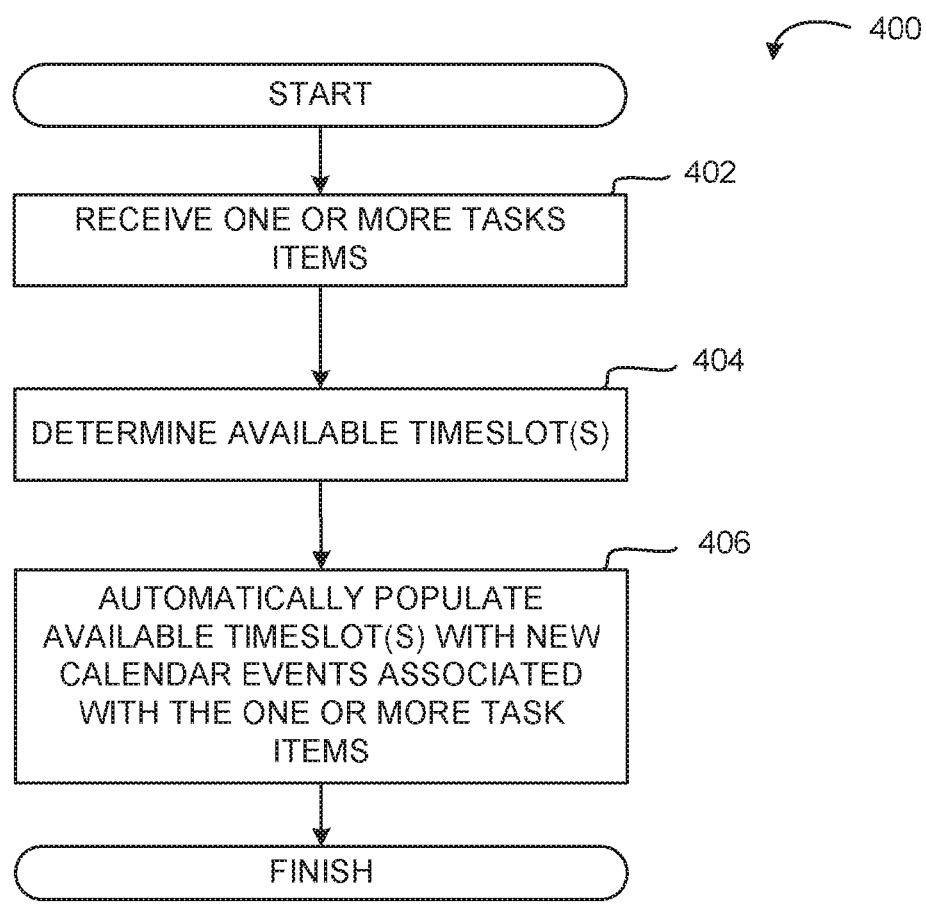
FIG. 4A is a flowchart illustrating an example embodiment of a method of automatic scheduling on an electronic device in accordance with the present disclosure.

FIG. 4A shows an example flowchart of a method 400 of automatic scheduling on an electronic device in accordance with one example embodiment of the present disclosure. The method may be carried out by software executed, for example, by a processor. Coding of software for carrying out such a method 400 is within the scope of a person of ordinary skill in the art provided the present disclosure. The method 400 may contain additional or fewer processes than shown and/or described, and may be performed in a different order in other embodiments. Computer-readable code executable by the processor 202 to perform the method 400 may be stored in a computer-readable medium such as the memory 260 of the device 200.

The method 400 begins with the event scheduler 290 receiving one or more tasks items associated with a user at 402, such as the user of the device 200. As described above, each task item includes information about the task such as a duration 312 of the task and possibly other information such as a due date 314 and priority 316, as described above. Each task item is defined by a data object which stores task information in a prescribed format or schema which, for example, may be compatible with a task format or schema of the PIM server 132, such as Microsoft Exchange™ and the PIM client on the host computer 130, such as Microsoft Office™.

The tasks may be received from the task database 292 stored, for example, in the memory 260 of the device 200. In such cases, receiving the one or more tasks comprises obtaining the one or more tasks from the task database 292 associated with the user. As noted above, the task database 292 associated with the user and the calendar database 294 associated with the user are typically distinct databases which are separately maintained from each other. Tasks and associated calendar events may be linked, as described in greater detail below. The method 400 may be initiated in response to input to schedule all or selected unscheduled tasks which are available for scheduling, for example, using the task manager user interface 360 and selecting (e.g., checking) the schedule field for the respective tasks. In this way, a list of one or more tasks can be provided to the event scheduler 290 for scheduling. Alternatively, the input to select all or some unscheduled tasks for scheduling may be provided by the selection of a menu option in an invokable menu, toolbar, or the like. Alternatively, the one or more tasks may be received as input from the user in 402. For example, a task item may be received by the creation and storing of a task item in response to corresponding user input in the task user interface 300 shown in FIG. 3. In some embodiments, selecting (e.g., checking) the value of the schedule field 324 in the task user interface 300 may be used to specify that the task is to be scheduled. In other embodiments, the method 400 may be automatically initiated by the storing of the new task item. For another example, one or more tasks may be dragged and dropped into the calendar application 284, the dragged and dropped task would then be scheduled by the event schedule 290. The one or more tasks may be dragged and dropped on any user interface element corresponding to the calendar application 284 or only designed user interface elements corresponding to the calendar application 284, depending on the embodiment.

A task may have one or more dependencies or conditions to be met before the task can be scheduled. For example, a document or other resources may be necessary to complete the task. The task user interface 300 may allow the user to specify the dependency or condition (e.g., in a freeform text field or from a predetermined number of options from a dropdown list) and a due date (which may include a time) for satisfying the dependency or condition, which may be set by the user or a default value. A reminder notification is then provided at or before the due date for satisfying the dependency or condition, e.g. on the display 212. When the due date arrives, a prompt as to whether the dependency or condition has been met is provided, e.g. on the display 212. If the dependency or condition has been met, the task can be scheduled and the operations 400 proceed to 404 for scheduling. If the dependency or condition has not been met, the task cannot be scheduled and the reminder is moved forward a predetermined duration by the event scheduler 290 or by an amount specified by the user.

At 404, the event scheduler 290 determines available timeslots in the calendar database 294 associated with the user. In at least some embodiments, some of the timeslots are schedulable and some of the timeslots are not schedulable. In embodiments in which one or more scheduling parameters are defined, determining the available timeslots comprises determining available timeslots in the calendar database 294 associated with the user that match the one or more scheduling parameters. For example, the calendar 284 or event scheduler may have scheduling parameters which define (i) days and/or times of day which are schedulable and (ii) days and/or times of day which are not schedulable. The scheduling parameters may define one or more of: a start of working (business) hours and an end of working (business) hours between which timeslots are schedulable, days of the week which are schedulable, days of the year which are schedulable (e.g., to accommodate various statutory holidays), or one or more breaks in each schedule day which are not schedulable (e.g., to accommodate lunch breaches or other breaks).

The scheduling parameters may be partially or completely configurable by the user or system administrator of the enterprise network 124, depending on the embodiment. Default values for the scheduling parameters may be automatically set. The one or more of the scheduling parameters could be fixed, for example, to enforce working hour restrictions required by law, in some embodiments.

At 406, the event scheduler 290 automatically (i.e., without user intervention) populates one or more of the available timeslots in the calendar database 294 associated with the user with new calendar events associated with the one or more tasks in accordance with one or more scheduling rules. The automatic populating comprises automatically generating one or more calendar events for a particular task, and storing the automatically generated calendar events in the calendar database 294 for the user. Each calendar event is defined by a data object which stores calendar event information in a prescribed format or schema which, for example, may be compatible with a calendar event format or schema of the PIM server 132, such as Microsoft Exchange™ and the PIM client on the host computer 130, such as Microsoft Office™. Once the information has been saved, the new calendar event will appear as a calendar entry for the respective timeslot which can be opened by appropriate input selecting the calendar event for viewing, editing or deletion. A flag indicating that the task item has been scheduled is set in the task item. The flag may be the schedule status field 330 described above in at least some embodiments.

It will be appreciated that each calendar event associated with a task item is defined by a calendar object which includes linking information to the associated task, and each task item associated with one or more calendar events is defined by a task object which includes linking information to the one or more associated calendar events. The linking information allows the event scheduler 290 to associate calendar events and tasks with each other. In at least some embodiments, each task in the task database 292 and each calendar event in the calendar database 294 have a unique identifier (ID). The task object of each task item associated with one or more calendar events includes the unique IDs of the one or more calendar events with which it is associated (e.g., within a discrete field), and the calendar object of each calendar event associated with a task item includes the unique ID of the associated task (e.g., within a discrete field). While not shown in the task user interface 300, it is contemplated that in other embodiments the calendar events associated with a particular task (e.g., identified by the calendar IDs in the corresponding task object) and possibly information about the calendar events, may be displayed in the task user interface 300 along with, or instead of, the schedule status field 330. It is also contemplated that the displayed calendar event information may include a link to each associated calendar event, so that selecting a link causes the associated calendar event to be opened.

The scheduling rules are rules which define how and when available timeslots are populated, examples of which are described more fully below. The calendar events are at least partially populated with task information stored in the associated task item. The calendar events are allocated for each of the one or more tasks in series rather than in parallel. The calendar events are typically scheduled in accordance with an order of the one or more tasks. For example, the tasks may be scheduled in accordance with an order of creation (e.g., chronological order), an order of priority base on a value of the priority field 316 of the respective task item as described more fully below, or a combination thereof. This avoids collisions/conflicts caused by attempting to schedule more than one calendar event at the same timeslot and facilitates the application of scheduling rules, among other things.

As described above, tasks may have a due date specified by a due date field 314. The due date is specified in terms of date and optionally time. In such embodiments, the one or more scheduling rules may include a due date rule which specifies that new calendar events associated with the one or more tasks are automatically populated in the calendar database so that calendar events associated with tasks having a due date are scheduled to be completed before the due date of the respective tasks. For example, calendar events associated with tasks having a due date may be scheduled to be completed a threshold duration before the due date of the respective tasks to give the user a buffer in case the task takes more time to complete than initially thought, and additional time to complete the task is required. For example, a threshold duration of a number days could be applied, e.g. 2 days.

Also as described above, tasks may have a priority specified by a priority field 316. The value of the priority is one of "Low", "Normal" or "High" in some embodiments. In such embodiments, the one or more scheduling rules may include a priority rule which specifies that new calendar events associated with the one or more tasks are automatically populated in the calendar database so that calendar events associated with tasks having a priority are scheduled in accordance with an order of priority based on the priority associated with the one or more tasks, for example, a decreasing order of priority (e.g., from High to Low). For example, "High" priority tasks may be automatically populated first, followed by "Normal" priority tasks, followed last by "Low" priority tasks. This allows higher priority tasks to be scheduled before lower priority tasks.

The due date rule and priority rule described above may be used separately or together, depending on the embodiment.

Figure 4B:
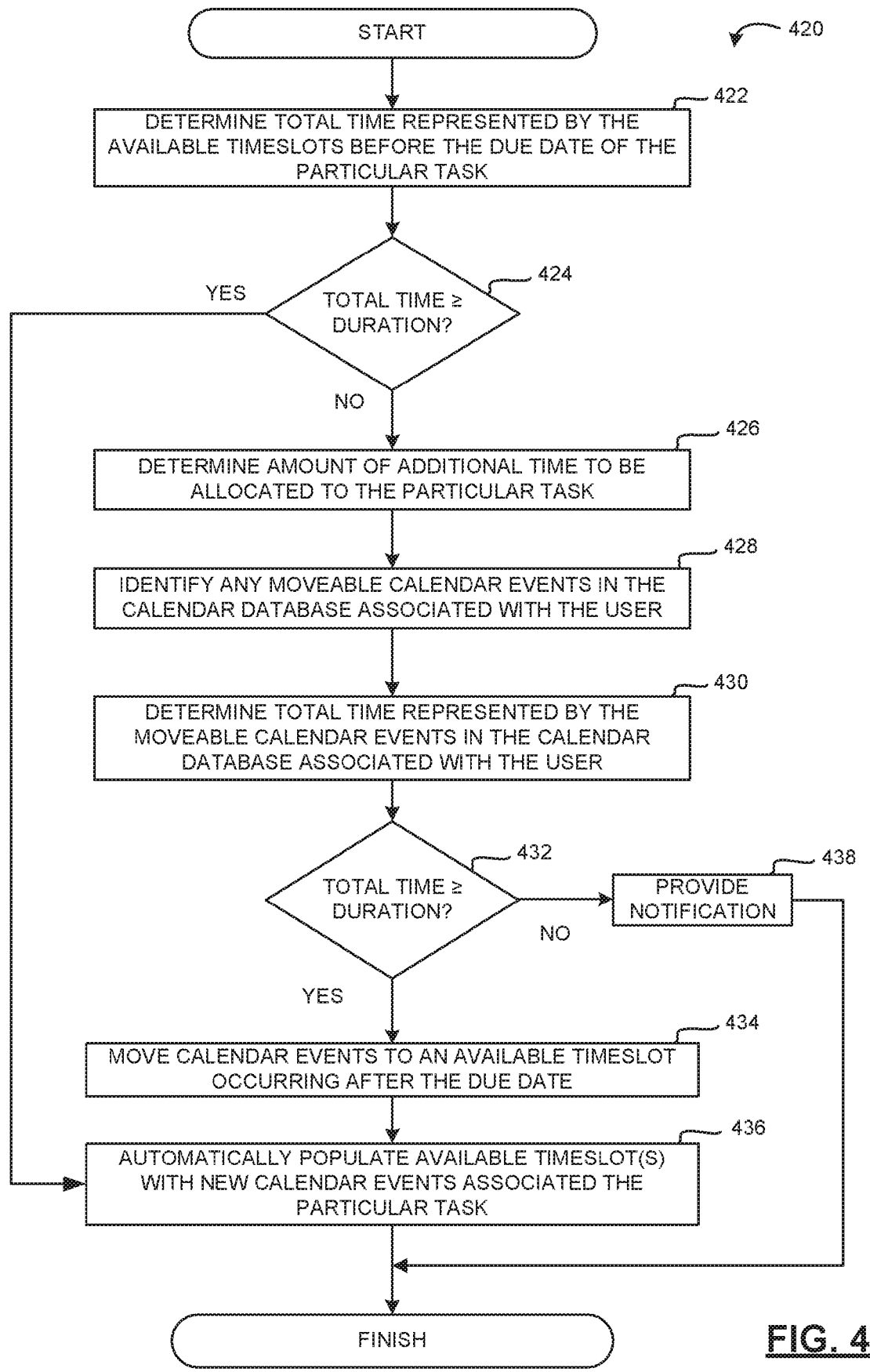
FIG. 4B is a flowchart illustrating an example embodiment of a method automatically populating available timeslots when a particular task has an associated due date in accordance with the present disclosure.

FIG. 4B illustrates a method 420 for automatically populating one or more of the available timeslots in the calendar database 294 associated with the user when a task has an associated due date. The method may be carried out by software executed, for example, by a processor. Coding of software for carrying out such a method 420 is within the scope of a person of ordinary skill in the art provided the present disclosure. The method 420 may contain additional or fewer processes than shown and/or described, and may be performed in a different order in other embodiments. Computer-readable code executable by the processor 202 to perform the method 420 may be stored in a computer-readable medium such as the memory 260 of the device 200.

At 422, when a task has an associated due date, the event scheduler 290 determines a total time represented by the available timeslots before the due date of the particular task. At 424, the event scheduler 290 determines whether the total time represented by the available timeslots before the due date is greater than or equal to the associated duration of the particular task.

At 436, when the total time represented by the available timeslots before the due date is greater than or equal to the associated duration of the particular task, the event scheduler 290 automatically populates one or more of the available timeslots in the calendar database 294 associated with the user with new calendar events associated with the particular task in accordance with the one or more scheduling rules.

At 426, when the total time represented by the available timeslots before the due date is less than the associated duration of the particular task (block 424), the event scheduler 290 determines an amount of additional time to be allocated to the particular task.

At 428, the event scheduler 290 identifies any moveable calendar events in the calendar database 294 associated with the user before the due date which can be moved. Moveable calendar events can be determined in many different ways. For example, the event scheduler 290 can consider who create the calendar event, the location of the calendar event, who else is invited (if anyone), and the availability of any other people, among other possibilities. For another example, when a calendar event is associated with a task having an associated priority, the priority of the associated task can be used to determine whether the calendar event is moveable. In such embodiments, calendar events associated with a task having a lower priority than the particular task are identified as moveable.

For yet another example, when a calendar event is associated with a task having a privacy setting, the privacy setting of the associated task can be used to determine whether the calendar event is moveable. As described above, the value of the privacy setting field can be either "Private" or "Public". When a task has the privacy setting of "Public", the associated calendar events can only be moved by the user. When a task has the privacy setting of "Private", the associated calendar events can be moved by either the event scheduler 290 or the user. In such embodiments, tasks having the privacy setting of "Public" are identified as not moveable and tasks having the privacy setting of "Private" are identified as moveable.

At 430, the event scheduler 290 determines a total time represented by any moveable calendar events in the calendar database 294 associated with the user before the due date.

At 432, the event scheduler 290 determines whether the total time represented moveable calendar events in the calendar database 294 associated with the user before the due date is greater than or equal to the associated duration of the particular task.

At 434, when the total time represented by any moveable calendar events in the calendar database 294 associated with the user before the due date is greater than or equal to the amount of additional time to be allocated to the particular task, the event scheduler 290 moves one or more of the moveable calendar events in the calendar database 294 associated with the user to an available timeslot occurring after the due date until the total time represented by the available timeslots before the due date is greater than or equal to the associated duration of the particular task. The event schedule 290 moves the one or more of the moveable calendar events in the calendar database 294 in accordance with the one or more scheduling rules used when automatically populating available time slots in some embodiments. In other embodiments, the event schedule 290 may moves the one or more of the moveable calendar events in the calendar database 294 in accordance with a different set of scheduling rules.

Next, operations proceed to 436 described above, in which the event scheduler 290 automatically populates one or more of the available timeslots in the calendar database 294 associated with the user with new calendar events associated with the particular task in accordance with the one or more scheduling rules.

At 438, when the total time represented by any moveable calendar events in the calendar database 294 associated with the user before the due date is less than the amount of additional time to be allocated to the particular task, the event scheduler 290 provides a notification. The notification may be a message displayed on the display 212 of the device 200 which notifies the user that there is insufficient time to reschedule the task. The user can then take corrective action if desired or necessary. For example, the due date for the task could be adjusted or the user could manually move tasks which the event scheduler 290 is unable to move automatically.

Figure 5:
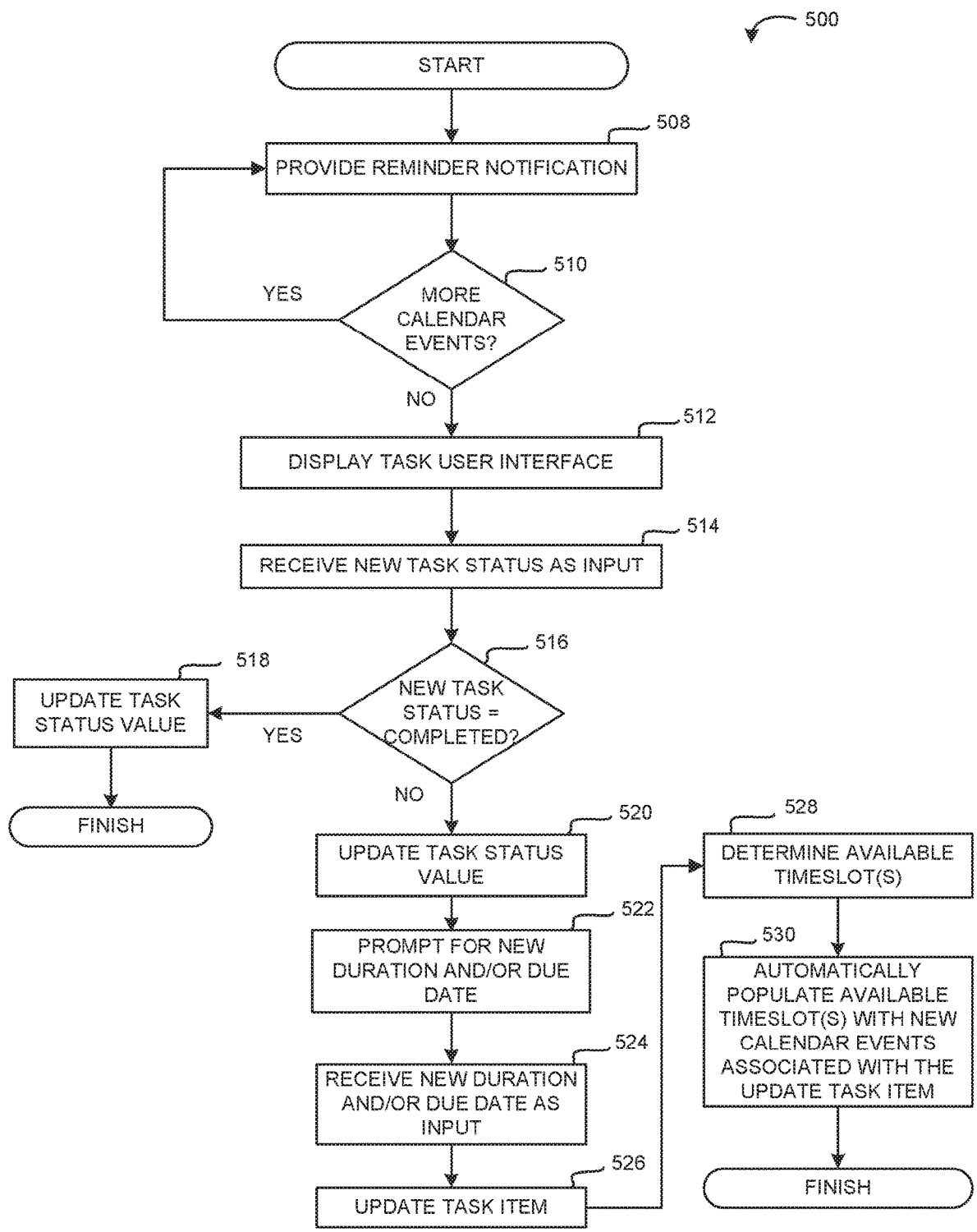
FIG. 5 is a flowchart illustrating an example embodiment of a method of processing a scheduled task in accordance with the present disclosure.

FIG. 5 shows an example flowchart of a method 500 of processing a scheduled task in accordance with one example embodiment of the present disclosure. The method may be carried out by software executed, for example, by a processor. Coding of software for carrying out such a method 500 is within the scope of a person of ordinary skill in the art provided the present disclosure. The method 500 may contain additional or fewer processes than shown and/or described, and may be performed in a different order in other embodiments. Computer-readable code executable by the processor 202 to perform the method 500 may be stored in a computer-readable medium such as the memory 260 of the device 200.

At 508, the calendar 284 provides a reminder notification at the start or, or before the start of, a calendar event associated with a particular task. The reminder notification may be provided at a predetermined time before the start of the calendar event which may be set by a duration of the reminder field 322 of the corresponding task item, which may be set using the task user interface 300. The reminder notification may comprise a message displayed on the display 212 of the device 200 which displays task information concerning the particular task. The task information may include information such as the subject 310, time required (or duration) 312, due date 314, priority 316, status 318, and privacy 320. Additional information, such as a note 328, may also be included in the displayed task information. The reminder notification may not be provided in all embodiments or circumstances, for example, if the task user interface 300 does not include a reminder field 322 or if the reminder feature is disabled.

Figure 6:
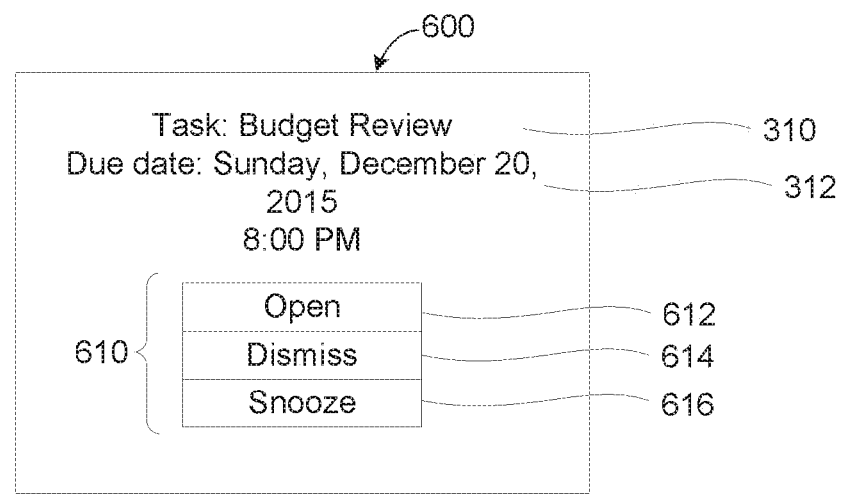
FIG. 6 is a diagrammatic view of an example reminder user interface screen for a calendar application in accordance with the present disclosure.

The reminder notification may be provided in an event reminder dialog box, an example of which is shown in FIG. 6. The event reminder dialog box 600 comprises a plurality of buttons 610 which include an open button 612 (designated by "Open") for viewing the details of the scheduled calendar event in an interface screen similar to the task user interface 300 (FIG. 3A), a defer button 614 (designated by "Snooze") for deferring the reminder to a new time and date, and a dismiss button 614 (designated by "Dismiss") for dismissing the reminder.

When there is more than one calendar event for a particular task (decision block 510), the reminders are provided at the start or, or before the start of, the next scheduled calendar event. If there are no more calendar events scheduled for the particular task, this means that a total time represented by expired calendar events is greater than or equal to the associated duration of the particular task, and operations proceed to 512. In other words, the user has had scheduled time to complete the task at least equal to the time required specified by the user.

At 512, the event scheduler 290 automatically displays the task user interface 300 on the display 212 of the device 200 after completion of the last calendar event associated with the particular task. In the described embodiment, the task user interface 300 that is displayed is the same as that used to create and edit a task. In other embodiments, a different task user interface could be displayed. As described above, the task user interface 300 includes a task status field 318 having a value selectable from a number of predetermined task status field options such as "Completed" or "Not Completed". In the shown embodiment, the task status field options include "Not Started", "In Progress", "Waiting on someone else", "Deferred" and "Completed". In some embodiments, the task user interface 300 is automatically displayed only after a last completed calendar event associated with the particular task when more than one calendar event is associated with the particular tasks. This avoids unnecessary user interruptions since the user has not yet had scheduled time to complete the task at least equal to the time required specified by the user. Accordingly, it is unlikely that the task is completed. Alternatively, the task user interface could be automatically displayed after each completed calendar event associated with the particular task in other embodiments. This may be useful, for example, to allow the status to be updated even if the task has not yet been completed.

At 514, input is received from the user via the input devices 206. At 516, the event scheduler 290 determines whether the input set the value of the task status field 318 as a first value (such as "Completed") or another value. The other value may vary between embodiments. For example, in some embodiments the other value could be "Not Completed" as described above. Alternatively, in other embodiments the other value could be "Not Started", "In Progress", "Waiting on someone else" or "Deferred" as described above.

At 518, in response to the first value (e.g., "Completed") being set as the value of the task status field 318, the event scheduler 290 updates the value of the task status field 318 of the task item associated with the particular task. If the task is a dependency for other tasks, the other tasks are released if there are not other dependencies and are made available for scheduling. In some embodiments, the priority ranking of the remaining tasks may be updated accordingly.

At 520, in response to a value other than the first value (e.g., "Not Completed" or one of "Not Started", "In Progress", "Waiting on someone else" or "Deferred") being set as the value of the task status field 318, the event scheduler 290 updates the task status field 318 in the corresponding task item. It will be appreciated that a status other than the first value, i.e. other than "Completed", indicates that the task is uncompleted and that additional time to complete the task should be allocated and/or a new due date should be set. While more than one other value may be provided, in the described embodiment the value of the task status field 318 when it is other than the first value (i.e. other than "Completed") is merely informational and does not affect the operations 500. In other embodiments, it is contemplated that the value of the task status field 318 when it is other than the first value may affect the operations 500, the operations 500 may affect the value of the task status field 318, or both. As noted above, in some embodiments the status of "Not Started" may be automatically assigned by the task application 288 before any scheduled calendar event associated with a particular task have occurred (e.g., before such events have been started or completed) and that status of "In Progress" may be automatically assigned by the task application 288 after a scheduled calendar event associated with the particular task has occurred but other scheduled calendar event associated with the task remain. In some embodiments, if the status 318 is set to "Waiting for someone else" the user may be provided with an option to specify an action on which the task depends and an owner of the action via a shared calendar such as that provided by Microsoft Exchange™. If the status 318 is set to "Deferred" the user may be provided with an option to specify the date to resume scheduling the task.

At 522, the event scheduler 290 automatically displays a prompt on the display 212 of the device 200, for additional time (e.g., a new duration) and/or a new due date for the particular task.

At 524, a new duration and/or a new due date is received as input from the user via the input devices 206.

At 526, in response to the new duration and/or a new due date received as input the task item associated with the particular task is updated. In response to receiving a new duration as input, the event scheduler 290 automatically changes the value of the duration field 312 of the task item associated with the particular task to the new duration received as input. In response to receiving a new due date as input, the event scheduler 290 automatically changes the value of the due date field 314 of the task item associated with the particular task due date to the new due date received as input.

At 528, the event scheduler 290 determines available timeslots in the calendar database 294 associated with the user.

At 530, the event scheduler 290 automatically populates one or more of the available timeslots in the calendar database 294 associated with the user with one or more new calendar events associated with the particular task in accordance with the new duration and/or due new due date and the one or more scheduling rules.

Variations of the operations 400, 420 and 500 are possible. For example, while the operations 400, 420, 500 are described separately, it is contemplated that the operations could cooperate or be performed together in at least some embodiments. In addition, while the operations 400, 420, 500 are described as being performed by a mobile wireless communication device 200, the operations 400, 420, 500 could be performed by a computer, such as a computer 130, or could be performed at least partially by a server, such as the PIM server 132. In addition to the operations 400, 420 and 500, it is contemplated that users could drag and drop a task into a specific timeslot in a displayed calendar view of the calendar application 284 to create an associated calendar event at that specific timeslot. The drag and drop operation would create and save a calendar event having calendar at the timeslot having a calendar event information derived from the task information of the corresponding task.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

What is claimed is:

1. A method, comprising:
   determining, by an electronic device, that a last calendar event associated with a task has been completed, wherein the task is associated with a plurality of calendar events, and determining that the last calendar event associated with the task has been completed comprises determining that there are no more calendar events scheduled for the task;
   in response to the electronic device determining that the last calendar event among the plurality of calendar events has been completed, automatically outputting, on the electronic device, a task user interface, wherein the task user interface comprises a task status field for the task;
   receiving, through the task user interface, a user input indicating a task status value;
   updating, by the electronic device, a task status based on the task status value;
   determining, by the electronic device, that the task status value indicated by the user input does not represent completed;
   in response to the electronic device determining that the task status value indicated by the user input does not represent completed, automatically outputting, on the electronic device, a user interface object requesting an additional duration or a new due date for the task;
   receiving, by the electronic device, a second user input indicating the additional duration or the new due date for the task;
   determining, by the electronic device, available timeslots of a user between a current time and a future time indicated by the additional duration or the new due date in a calendar database;
   in response to the electronic device determining the available timeslots of the user, automatically populating, by the electronic device, one or more timeslots of the user among the available timeslots for the task with one or more new calendar events associated with the task;
   determining, by the electronic device, that the task status value indicated by the user input represents waiting; and
   in response to the electronic device determining that the task status value indicated by the user input represents waiting, automatically outputting another user interface object with an option to specify an action that the task depends on via a shared calendar.

2. The method of claim 1, wherein the task status value represents one of completed, not completed, not started, in progress, waiting, or deferred.

3. The method of claim 1, further comprising:
   updating, by the electronic device, a duration of the task or a due date of the task based on the second user input.

4. The method of claim 1, wherein the one or more timeslots are populated based on one or more scheduling rules.

5. The method of claim 1, further comprising: determining, by the electronic device, that the task status value indicated by the user input represents deferred; and
   in response to the task status value indicated by the user input representing deferred, outputting another user interface object with an option to specify a date to resume scheduling the task.

6. The method of claim 1, wherein the task status field of the task user interface comprises a selectable list of task status field options.

7. An electronic device, comprising:
   a memory storing instructions; and
   one or more hardware processors in communication with the memory, wherein the one or more hardware processors execute the instructions to:
      determine, by the electronic device, that a last calendar event associated with a task has been completed, wherein the task is associated with a plurality of calendar events, and the determination that the last calendar event associated with the task has been completed comprises a determination that there are no more calendar events scheduled for the task;
      in response to the determination by the electronic device that the last calendar event among the plurality of calendar events has been completed, automatically output, on the electronic device, a task user interface, wherein the task user interface comprises a task status field for the task;
      receive, through the task user interface, a user input indicating a task status value;
      update a task status based on the task status value;
      determine, by the electronic device, that the task status value indicated by the user input does not represent completed;
      in response to the determination by the electronic device that the task status value indicated by the user input does not represent completed, automatically output a user interface object requesting an additional duration or a new due date for the task;
      receive a second user input indicating the additional duration or the new due date for the task;
      determine available timeslots of a user between a current time and a future time indicated by the additional duration or the new due date in a calendar database;
      in response to the determination of the available timeslots of the user, automatically populate one or more timeslots of the user among the available timeslots for the task with one or more new calendar events associated with the task;

determine, by the electronic device, that the task status value indicated by the user input represents waiting; and in response to the determination by the electronic device that the task status value indicated by the user input represents waiting, automatically output another user interface object with an option to specify an action that the task depends on via a shared calendar.

8. The electronic device of claim 7, wherein the task status value represents one of completed, not completed, not started, in progress, waiting, or deferred.

9. The electronic device of claim 7, wherein the one or more hardware processors execute the instructions to:

update a duration of the task or a due date of the task based on the second user input.

10. The electronic device of claim 7, wherein the one or more timeslots are populated based on one or more scheduling rules.

11. The electronic device of claim 7, wherein the one or more hardware processors execute the instructions to: determine, by the electronic device, that the task status value indicated by the user input represents deferred; and in response to the task status value indicated by the user input representing deferred, output another user interface object with an option to specify a date to resume scheduling the task.

12. The electronic device of claim 7, wherein the task status field of the task user interface comprises a selectable list of task status field options.

13. One or more non-transitory computer-readable media containing instructions which, when executed, cause an electronic device to perform operations comprising:

determining that a last calendar event associated with a task has been completed, wherein the task is associated with a plurality of calendar events, and determining that the last calendar event associated with the task has been completed comprises determining that no calendar events associated with the task remain uncompleted;

in response to the electronic device determining that the last calendar event among the plurality of calendar events has been completed, automatically outputting, on the electronic device, a task user interface, wherein the task user interface comprises a task status field for the task;

receiving, through the task user interface, a user input indicating a task status value;

updating a task status based on the task status value;

determining, by the electronic device, that the task status value indicated by the user input does not represent completed;

in response to the electronic device determining that the task status value indicated by the user input does not represent completed, automatically outputting, on the electronic device, a user interface object requesting an additional duration or a new due date for the task;

receiving a second user input indicating the additional duration or the new due date for the task;

determining available timeslots of a user between a current time and a future time indicated by the additional duration or the new due date in a calendar database;

in response to the electronic device determining the available timeslots of the user, automatically populating, by the electronic device, one or more timeslots of the user among the available timeslots for the task with one or more new calendar events associated with the task;

determining, by the electronic device, that the task status value indicated by the user input represents waiting; and in response to the electronic device determining that task status value indicated by the user input represents waiting, automatically outputting another user interface object with an option to specify an action that the task depends on via a shared calendar.

14. The one or more computer-readable media of claim 13, wherein the task status value represents one of completed, not completed, not started, in progress, waiting, or deferred.

15. The one or more computer-readable media of claim 13, the operations further comprising:

updating a duration of the task or a due date of the task based on the second user input.

16. The one or more computer-readable media of claim 13, wherein the operations further comprise: determining, by the electronic device, that the task status value indicated by the user input represents deferred; and in response to the task status value indicated by the user input representing deferred, outputting another user interface object with an option to specify a date to resume scheduling the task.

17. The one or more computer-readable media of claim 13, wherein the task status field of the task user interface comprises a selectable list of task status field options.

* * * * *